W. VEBER, Jr.
Plow-Cleaner.
No. 58,323.
Patented Sept. 25, 1866.
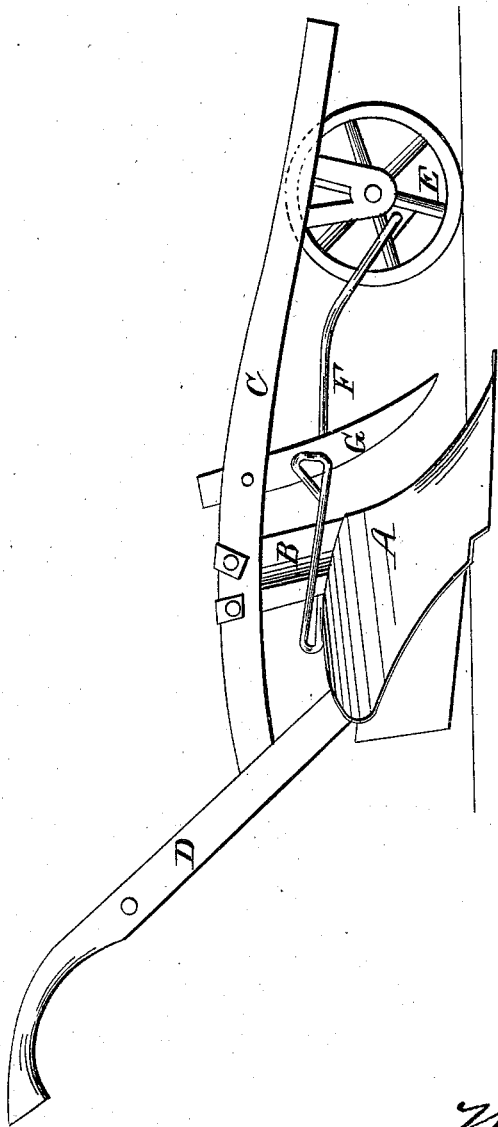
Witnesses.
Inventor.

UNITED STATES PATENT OFFICE.

WILLIAM VEBER, JR., OF SHINGLE CREEK, NEW YORK.

IMPROVEMENT IN PLOWS.

Specification forming part of Letters Patent No. 58,323, dated September 25, 1866.

*To all whom it may concern:*

Be it known that I, WILLIAM VEBER, Jr., of Shingle Creek, in the county of St. Lawrence, State of New York, have invented a new and useful Improvement in Attachments to Plows; and I do hereby declare that the following is a full, clear, and exact description thereof.

The nature of my invention consists in constructing a device and attaching it to a plow, so as to prevent the plow from clogging under the beam or in front of the colter.

Great difficulty has been heretofore encountered in plowing stubble-ground from the fact that the stubble and other matter gathers in front of the plow standard and colter, and rolls up under the beam and throws the plow out of the ground.

By my invention I am able to obviate this difficulty by attaching a crank-pin to the gage-wheel, that is located under the front end of the beam, and to the said pin is attached a rod that extends back and loops around the standard, and extends forward to the front side of the standard and colter, so that as the wheel rolls it puts in motion the said rod, that reciprocates in such a manner as to remove all matter that may collect in front of the colter and under the beam.

To enable others skilled in the art to make and use my invention, I will proceed to describe its construction and operation.

The figure is a side elevation of my improved attachment.

Letters of like name and kind refer to like parts in the figure.

A represents the mold-board of a common plow, and B the standard that extends up from the mold-board, and secured to the beam C in in any common or well-known manner.

D D are the handles, also of common construction, and attached to the plow in the ordinary way.

E is a wheel, that is located under the forward end of the beam, and runs upon an adjustable pendent axle that is secured to the beam, and constructed in such a manner that it may be adjusted up or down, so as to gage the depth of the plow.

In one of the arms of the said wheel E is a crank-pin, to which is connected a rod, F, that extends back and loops around the standard B, and extends forward to the front side of the said standard B and colter G, at the same time having a bearing upon the top of the mold-board as it reciprocates back and forth when in operation.

The advantages of my invention over others are obvious from the fact of its simplicity and cheapness of construction, and in no way liable to get out of order, it being constructed of only one piece, while other devices introduced for the purpose of clearing the plow consist of a variety of parts, such as levers, cranks, and bolts, which are liable to get bent and out of order from the rough usage to which they are always subjected.

The operation of my invention is automatic and effective. As the plow proceeds across the field the gage-wheel E, that runs upon the ground, puts in motion the rod F, the front end of which is bent in the form of a triangle or other suitable form, and has a regular reciprocating motion, so that as the stubble or other matter accumulates in front of the standard and under the beam the rod F at every motion pushes it out of the way, so that the plow is not thrown out of the ground and the plowman hindered to back up to mend the balk, making it one of the most simple and effective devices of the kind ever attached to a plow.

Having thus described my invention, what I claim as new, and desire to secure by Letters Patent, is—

The rod F, attached to a plow, when constructed and operated as herein shown, substantially as and for the purpose described.

The above specification of my invention signed by me this 30th day of July, 1866.

WILLIAM VEBER, JR.

Witnesses:
MASON G. WAIT,
N. H. MALL.